United States Patent
Sand et al.

(10) Patent No.: US 7,336,944 B2
(45) Date of Patent: Feb. 26, 2008

(54) METHOD AND APPARATUS FOR LEGAL INTERCEPT MONITORING OF A CELLULAR TELEPHONE MODEM (CTM) DEVICE

(75) Inventors: Donna Michaels Sand, Redmond, WA (US); John Gerard Adamek, Redmond, WA (US)

(73) Assignee: Lucent Technologies Inc., Murray Hill, NJ (US)

( * ) Notice: Subject to any disclaimer, the term of this patent is extended or adjusted under 35 U.S.C. 154(b) by 1132 days.

(21) Appl. No.: 10/609,222

(22) Filed: Jun. 27, 2003

(65) Prior Publication Data

US 2004/0266410 A1    Dec. 30, 2004

(51) Int. Cl.
H04M 1/76 (2006.01)
H04M 7/00 (2006.01)
H04M 9/00 (2006.01)

(52) U.S. Cl. .................. 455/414.4; 455/507; 455/560; 379/52; 379/93.15; 704/271

(58) Field of Classification Search ............... 455/507, 455/556.1, 557, 560, 552.1; 379/52, 93.14, 379/93.15, 93.17, 93.18, 100.13; 704/270.1, 704/271
See application file for complete search history.

(56) References Cited

U.S. PATENT DOCUMENTS

| | | | |
|---|---|---|---|
| 6,205,339 B1 * | 3/2001 | Leung et al. | 455/553.1 |
| 6,381,472 B1 * | 4/2002 | LaMedica et al. | 455/560 |
| 6,914,964 B1 * | 7/2005 | Levine | 379/52 |
| 7,133,696 B2 * | 11/2006 | Mauro, II | 455/560 |

OTHER PUBLICATIONS

United TTY Sales and Service, http://www.unitedtty.com/cgi-local/shop.pl/SID=1047938353.23588/page=product.html/pr..., pp. 1-2, May 27, 2003.
Sony Ericsson Mobile Special Needs Center, http://www.hitec.com/cgi-bin/sonyericssonmobile-snc.storefront/3ed3c2830249738c273f4..., pp. 1-2, May 27, 2003.
Sony Ericsson Mobile Special Needs Center, https://www.hitec.com/cgi-bin/sonyericssonmobile-snc.storefront/3f7d7dd0017b95ac273f417456740710/Catalog, 31 pages, Oct. 3, 2003.

* cited by examiner

Primary Examiner—Binh K. Tieu

(57) ABSTRACT

A method and apparatus for legal intercept monitoring of a cellular telephone modem (CTM) device. More particularly, a system incorporating a CTM-to-TTY/TDD converter and a Call Content Delivery Unit (CCDU) to facilitate the monitoring of calls made to or from a CTM device is implemented.

31 Claims, 10 Drawing Sheets

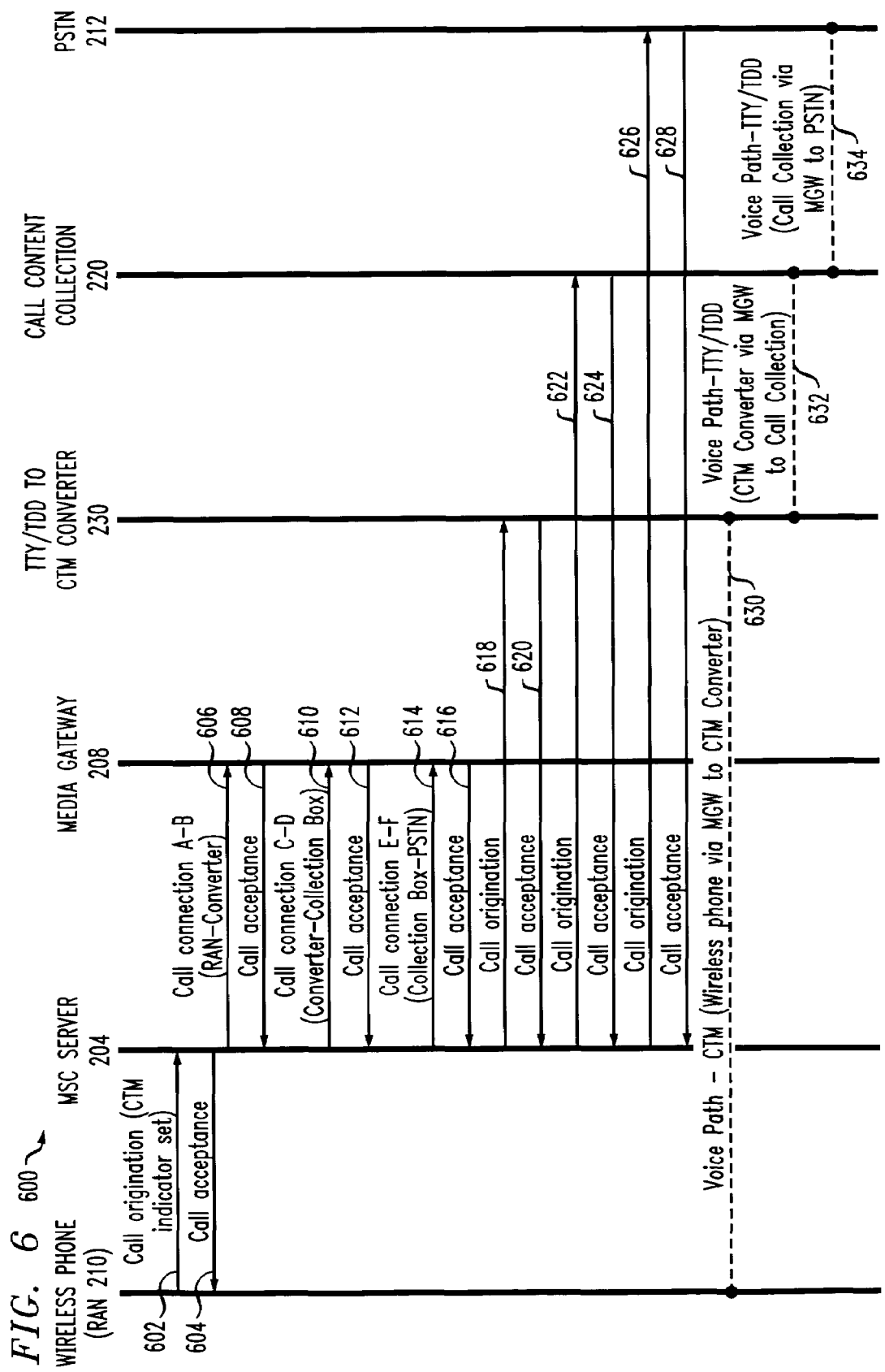

METHOD AND APPARATUS FOR LEGAL INTERCEPT MONITORING OF A CELLULAR TELEPHONE MODEM (CTM) DEVICE

BACKGROUND OF THE INVENTION

This invention relates to a method and apparatus for legal intercept monitoring of a cellular telephone modem (CTM) device. More particularly, the invention relates to a system incorporating a CTM-to-TTY/TDD converter and a Call Content Delivery Unit (CCDU) to facilitate the monitoring of calls made from a CTM device.

While the invention is particularly directed to the art of legal intercept monitoring of a CTM device, and will be thus described with specific reference thereto, it will be appreciated that the invention may have usefulness in other fields and applications. For example, the principles of the invention may be used in any application where monitoring of a call from a device having a different messaging format is desired.

By way of background, United States law provides that law enforcement agencies may monitor the telephone content of telephone conversations when appropriate court orders are issued. In this regard, any telephone user may be monitored. However, present technologies do not allow for all types of calls to be monitored. In particular, calls that originate or terminate with cellular telephone modem (CTM) devices which support Telephone Devices for the Deaf (TDD) cannot be monitored using present standards or technology.

More specifically, under traditional United States wireless standards, TDD devices support a method called teletype for TDD (TTY/TDD). However, GSM and UMTS wireless standards support CTM for support of TDD devices in Europe and elsewhere. These GSM and UMTS wireless standards, though, are now being implemented in the United States.

To illustrate the conventional technologies, reference is first made to FIG. 1. FIG. 1 illustrates an exemplary network having a bearer (or voice) path for a non-CTM, non-monitored call. More specifically, the network 10 is illustrated and it includes a mobile switching center (MSC) 12 having an MSC server 14 in communication with a packet backbone network 16. The packet backbone network 16 communicates with a media gateway 18 which, in turn, communicates with radio access network (RAN) 20 and public switched telephone network (PSTN) 22. The normal bearer path for such a call includes bearer path segment A and bearer path segment F. Because the call is non-CTM and non-monitored, there is no need for accommodating either of these special cases with respect to the bearer path. Calls that originate (or terminate) at either end of the network are processed using well known techniques.

Referring now to FIG. 2, an exemplary network 50 is illustrated. Within the network 50, a bearer path for a non-CTM, monitored call, is shown. More particularly, an MSC 52 is provided which includes an MSC server 54 and a packet backbone network 56. The packet backbone network 56 communicates with a media gateway 58 which is in communication with a radio access network (RAN) 60 and a public switched telephone network (PSTN) 62.

Also included within the MSC 52 is a call content delivery unit (CCDU) 70 which is used to collect call content for purposes of monitoring. Such monitoring techniques are well known in the field of law enforcement. The CCDU 70 may also reside in a location remote from the MSC 52, in which case appropriate communication paths are established so that the call monitoring and/or collection functions can be accomplished. In the configuration shown, however, the bearer path includes portion A which connects the wireless device to the media gateway and a portion D which allows delivery of call content to and from the CCDU 70. The call content collected by the CCDU 70 is also delivered to and from the PSTN 62 on bearer path portion E, which leads to the media gateway, and bearer path portion F which leads out to the public switch telephone network. Because this is a non-CTM call, no special treatment for CTM devices is required in this configuration. The format of the call content is the same for all portions on the bearer path. Calls that originate (or terminate) at either end of the network are processed using well known techniques.

Referring now to FIG. 3, the bearer path for a CTM, non-monitored call is illustrated within an exemplary network 100. More particularly, the network 100 includes a mobile switching center (MSC) 102 having an MCS server 104 and a packet backbone network 106. The mobile switching center (MSC) 102 also includes a media gateway 108 which communicates with a radio access network (RAN) 110 and a public switched telephone network (PSTN) 112. Notably, the MSC 102 also includes a converter 120 which converts call content in CTM format to call content in TTY/TDD format in manners that are well known to those in the field. It should be understood that, like the CCDU 70 of FIG. 2, the converter 120 may reside in a location remote from the MSC 102. In such a case, communication paths are preferably established between the MSC 102 and the converter 120 so that appropriate conversion functions may be carried out by the converter. In operation, for example, for a call originating in the radio access network 110 that is in CTM format, call content is received by the media gateway 108 on bearer path portion A and delivered to the converter 120 on bearer path portion B. The format of the call content on portions A and B is in CTM format. Of course, the converter 120 converts the CTM formatted call content to TTY/TDD format and delivers the call content on bearer path portion C back to the media gateway 108. The media gateway 108 then delivers the call content to a destination network such as PSTN 112, via bearer path portion F. Calls originating with the PSTN 112 and terminating with the RAN 110 can be likewise processed.

In FIGS. 1-3, the media gateway and MSC server are illustrated as being implemented on separate hardware platforms. However, it should be appreciated that the media gateway and MSC server may also be implemented on the same hardware platform. The differences between such implementations are well known to those skilled in the art.

As illustrated by FIGS. 1-3 and the above description of technology, it is apparent that there is no current technology that allows for monitoring of a call that originates or terminates in CTM format.

The present invention contemplates a new and improved method and apparatus for legal intercept monitoring of a cellular telephone modem (CTM) device that resolves the above-referenced difficulties and others.

SUMMARY OF THE INVENTION

A method and apparatus for method and apparatus for legal intercept monitoring of a cellular telephone modem (CTM) device are provided.

In one aspect of the invention, the method monitors a call, that originates from a cellular telephone modem (CTM) device and terminates in a destination network, in a system including a converter operative to convert call content from a CTM format to a Teletype for Telephone Devices for the Deaf (TTY/TDD) format and a Call Content Delivery Unit (CCDU). The method comprises receiving a call in a media gateway of a mobile switching center (MSC), recognizing the call as having call content in CTM format by the MSC, recognizing the call as being a monitored call by the MSC, instructing the media gateway by the MSC to establish a first bearer path to the converter, establishing the first bearer path, instructing the media gateway by the MSC to establish a second bearer path from the converter to the CCDU, establishing the second bearer path; instructing the media gateway by the MSC to establish a third bearer path from the CCDU to the destination network, establishing the third bearer path, delivering the call content in CTM format to the converter on the first bearer path, converting the call content in CTM format to call content in TTY/TDD format by the converter, delivering the call content in TTY/TDD format to the CCDU via the second bearer path, collecting the call content in TTY/TDD format by the CCDU and delivering the call content in TTY/TDD format to the destination network via the third bearer path.

In one aspect of the invention, the method monitors a call, that terminates in a cellular telephone modem (CTM) device and originates from another network, in a system including a converter operative to convert call content from a CTM format to a Teletype for Telephone Devices for the Deaf (TTY/TDD) format and a Call Content Delivery Unit (CCDU). The method comprises receiving a call in a media gateway of a mobile switching center (MSC), recognizing the call as terminating in the CTM device, recognizing the call as being a monitored call by the MSC, instructing the media gateway by the MSC to establish a first bearer path to the CCDU, establishing the first bearer path, instructing the media gateway by the MSC to establish a second bearer path from the CCDU to the converter, establishing the second bearer path, instructing the media gateway by the MSC to establish a third bearer path from the converter to the CTM device, establishing the third bearer path, delivering the call content in TTY/TDD format to the CCDU on the first bearer path, collecting the call content in TTY/TDD format by the CCDU, delivering the call content in TTY/TDD format to the converter via the second bearer path, converting the call content in TTY/TDD format to CTM format by the converter and delivering the call content in CTM format to the CTM device via the third bearer path.

In another aspect of the invention, an apparatus includes means for receiving a call, means for recognizing the call as having call content in CTM format, means for recognizing the call as being a monitored call, means for instructing a media gateway to establish a first bearer path to the converter, means for establishing the first bearer path, means for instructing the media gateway to establish a second bearer path, means for establishing the second bearer path, means for instructing the media gateway to establish a third bearer path, means for establishing the third bearer path, means for transmitting the call content in CTM format on the first bearer path, means for converting the call content in CTM format to call content in TTY/TDD format, means for transmitting the call content in TTY/TDD format on the second bearer path, means for collecting the call content in TTY/TDD format and means for delivering the call content in TTY/TDD format to the destination network via the third bearer path.

In another aspect of the invention, an apparatus includes means for receiving a call, means for recognizing the call as terminating in the CTM device, means for recognizing the call as being a monitored call, means for instructing a media gateway to establish a first bearer path to the CCDU, means for establishing the first bearer path, means for instructing the media gateway to establish a second bearer path, means for establishing the second bearer path, means for instructing the media gateway to establish a third bearer path, means for establishing the third bearer path, means for transmitting the call content in TTY/TDD format on the first bearer path, means for collecting the call content in TTY/TDD format, means for transmitting the call content in TTY/TDD format on the second bearer path, means for converting the call content in TTY/TDD format to CTM format and means for delivering the call content in CTM format to the CTM device via the third bearer path.

In another aspect of the invention, a mobile switching center (MSC) includes a media gateway operative to receive the call, an MSC server operative to recognize the call as having call content in CTM format or as terminating in a CTM device, to recognize the call as being a monitored call, and to instruct the media gateway to selectively establish bearer paths upon the recognition, a converter operative to convert the call content in CTM format to call content in TTY/TDD format, and vice versa, and a call content delivery unit (CCDU) operative to collect the call content in TTY/TDD format.

In another aspect of the invention, a bearer path is established by the media gateway between the media gateway and the converter upon the recognition by the MSC server.

In another aspect of the invention, a first bearer path is established by the media gateway between the converter and the CCDU upon the recognition by the MSC server.

In another aspect of the invention, a bearer path is established by the media gateway between the CCDU and the media gateway upon the recognition by the MSC server.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 4A:
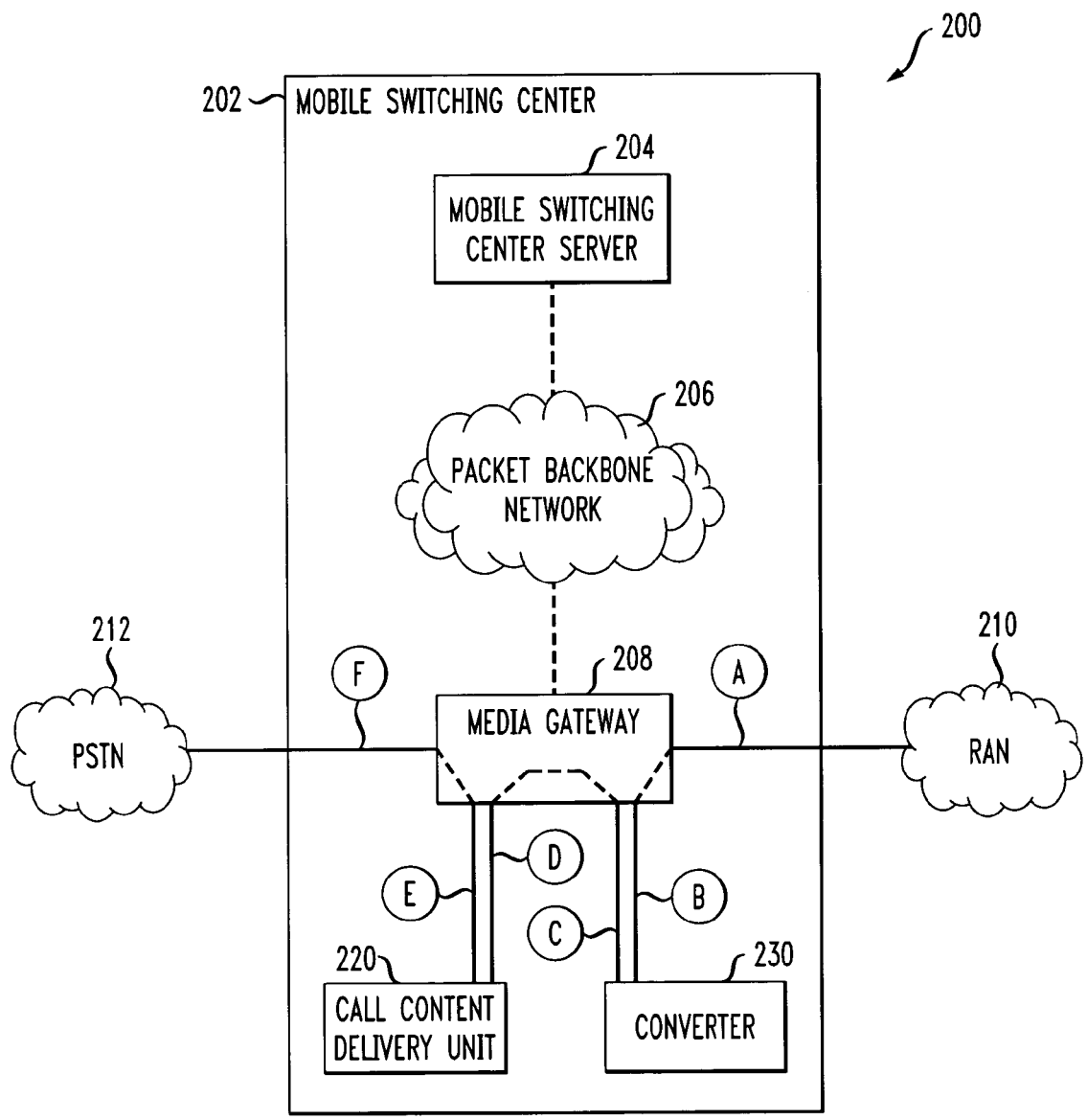
FIGS. 4(a) through 4(d) illustrate bearer paths for CTM, monitored calls within exemplary networks according to the present invention.

Referring now to the drawings wherein the showings are for purposes of illustrating the preferred embodiments of the invention only and not for purposes of limiting same, FIG. 4(a) provides a view of an overall preferred system according to the present invention. As shown, a network 200 includes a mobile switching center (MSC) 202. The MSC includes an MSC server 204 in communication with a packet backbone network 206. The packet backbone network is, in turn, in communication with a media gateway 208 which is capable of communicating with various networks associated with the MSC 202. For example, the media gateway 208 is in communication with a radio access network (RAN) 210 (which may include a variety of network elements and elements that communicate with the network such as wireless user devices, e.g. wireless phones) and a public switch telephone network (PSTN) 212. In addition, the mobile switching center 202 includes a call content delivery unit (CCDU) 220 and a converter 230. It should be understood that the converter 230 is operative to convert call content in CTM format to call content in TTY/TDD format. It should be further appreciated that the converter can also convert TTY/TDD formatted content to CTM formatted content.

The bearer paths that are established in the network are shown. In particular, a connection between RAN 210 and media gateway 208 is established along bearer path portion A. It should be appreciated that the call content along bearer path portion A is CTM format. A bearer path portion B is also illustrated as connecting the media gateway 208 to the converter 230. The call content on this portion of the bearer path is in CTM format.

Conversely, the call content on the bearer path portion C—that extends from the converter 230 back to the media gateway 208 is in TTY/TDD format. Of course, the converter converts the call content from one format to another. Likewise, the call content on bearer paths D, E and F is in the TTY/TDD format.

It is to be appreciated that the elements illustrated in FIG. 4(a) function in manners that are consistent with that which is well known in the art. Of course, the system is modified to implement the present invention. In this regard, it should be understood that the present invention is implemented in the system using various hardware modifications and software techniques that should be apparent to those skilled in the art upon a reading of the present disclosure. These modifications and techniques may vary from application to application, depending on a number of factors; however, they should nonetheless achieve the objectives of the invention.

For example, either one or both of the call collection delivery unit (CCDU) 220 or the converter 230 may be located remotely from the mobile switching center (MSC) 202. The precise location of these elements will vary from application to application depending on a variety of factors, including the objectives of the service providers and/or the network designers and manufacturers. For example, a call monitoring service provider may desire to control the monitoring equipment and, thus, maintain such equipment in its facility. As a further example, the network designer may wish incorporate all elements into the mobile switching center to facilitate ease of design. In these cases, the same bearer paths are established, through well known techniques for generally establishing bearer paths, to accomplish the functionality contemplated by the invention. Such systems may be more flexible in their implementation.

Figure 4B:
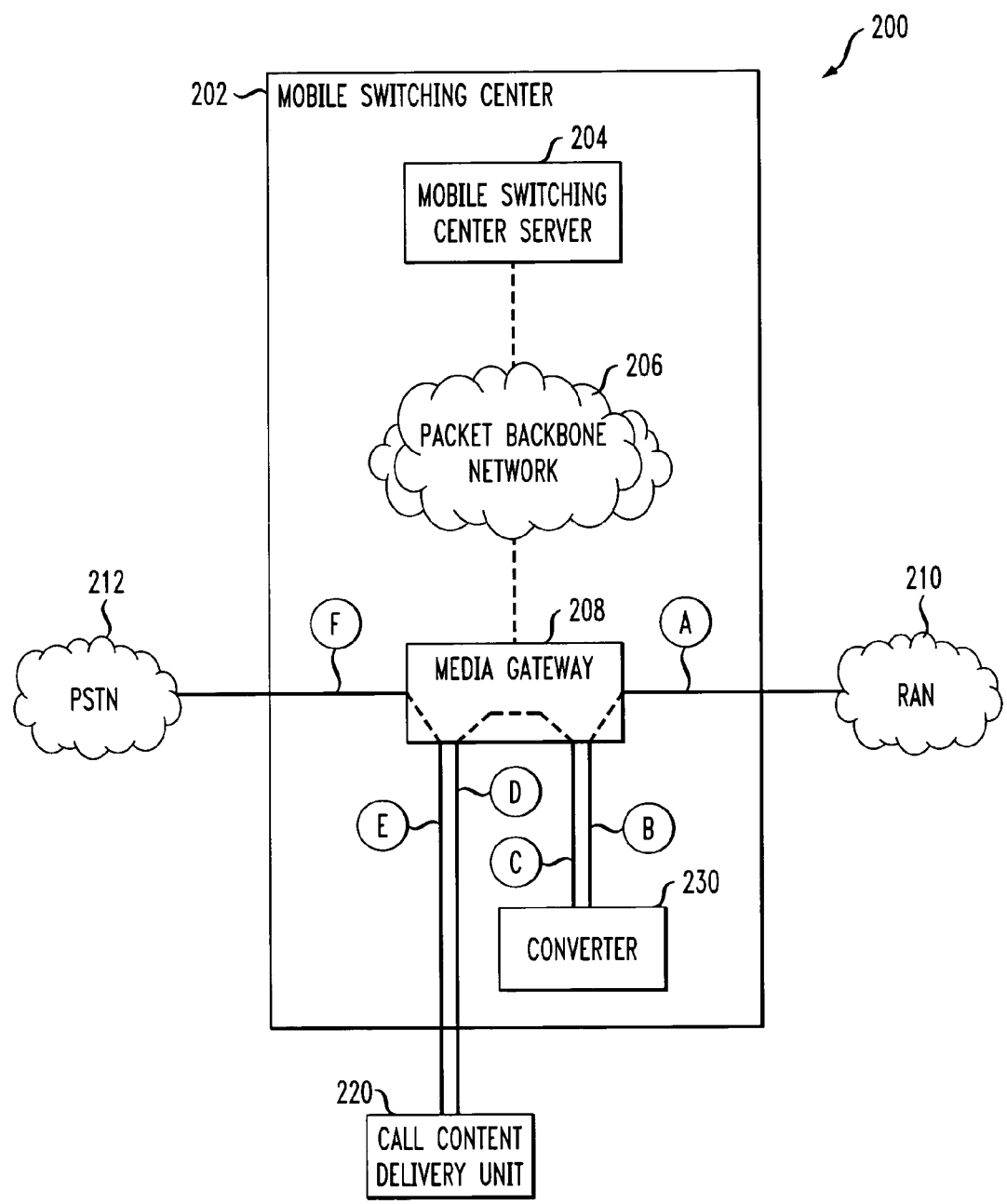

More particularly, FIG. 4(b) shows a system substantially similar to that shown in FIG. 4(a), except that the call collection delivery unit (CCDU) 220 is shown outside the physical structure of the mobile switching center (MSC) 202. This system functions as the system described in connection with FIG. 4(a), except that the bearer paths that are established to and from the call content delivery unit (CCDU) 220 necessarily account for the differing physical locations. The establishment of bearer paths between elements that do not reside in the same general location is well known in the art.

Figure 4C:
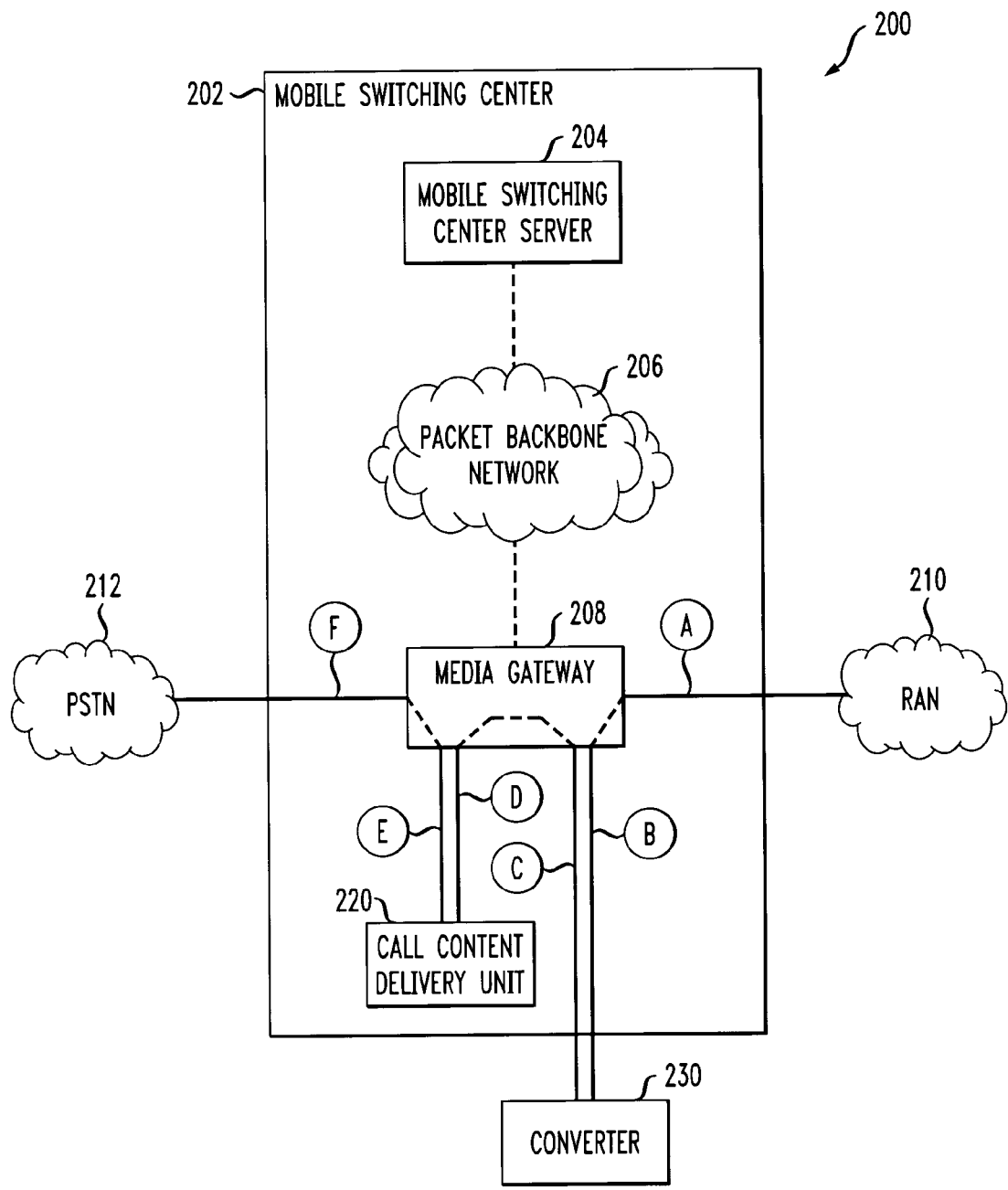

In addition, FIG. 4(c) shows a system substantially similar to that shown in FIG. 4(a), except that the converter 230 is shown outside the physical structure of the mobile switching center (MSC) 202. This system functions as the system described in connection with FIG. 4(a), except that the bearer paths that are established to and from the converter 230 necessarily account for the differing physical locations. The establishment of bearer paths between elements that do not reside in the same general location is well known in the art.

Figure 4D:
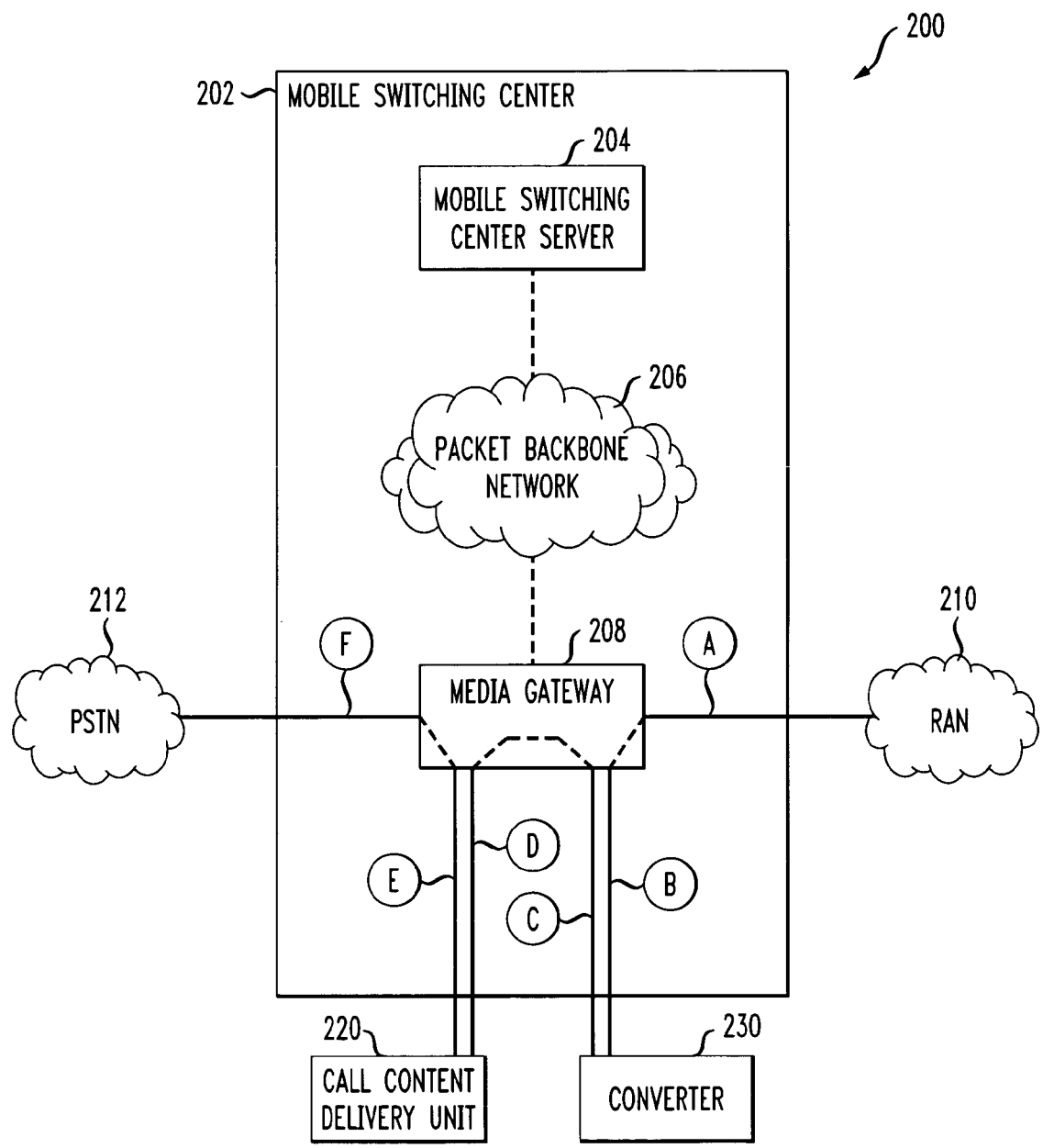

Furthermore, FIG. 4(d) shows a system substantially similar to that shown in FIG. 4(a), except that both the call collection delivery unit (CCDU) and the converter 230 are shown outside the physical structure of the mobile switching center (MSC) 202. This system functions as the system described in connection with FIG. 4(a), except that the bearer paths that are established to and from the call content delivery unit (CCDU) 220 and to and from the converter 230 necessarily account for the differing physical locations. The establishment of bearer paths between elements that do not reside in the same general location is well known in the art.

Likewise, the media gateway 208 and the MSC server 204 may be implemented on the same hardware platform, as opposed to separate hardware platforms as shown in FIGS. 4(a) through 4(d).

It should be understood that the inclusion of the CCDU unit and the converter unit within a system (e.g. the MSC) as contemplated by this invention, for the purpose of monitoring CTM formatted calls, was not heretofore known. Along these lines, establishing bearer paths to and from these network elements was also not heretofore known. In addition, the MSC server 204 (or, more generally, the MSC 202) includes the functionality of recognizing that an incoming call is a CTM call (either originating or terminating) during the call set-up process. The MSC also recognizes that an incoming is a monitored call. In this regard, the MSC server 204 (or, more generally, MSC 202) includes means for, or has the capability of, accessing an appropriate subscriber database within the network, e.g. a home location register (HLR), to determine whether a call is to be monitored.

The MSC server 204 (or, more generally, MSC 202) also includes the additional functionality of instructing the media gateway to set-up the bearer path to include portions B and C so that the call content can flow to and from the bearer path portions D and E. This additional functionality is triggered in the MSC server upon recognition that a CTM call, either originating or terminating, has been received and that it is a call that should be monitored.

Figure 5A:
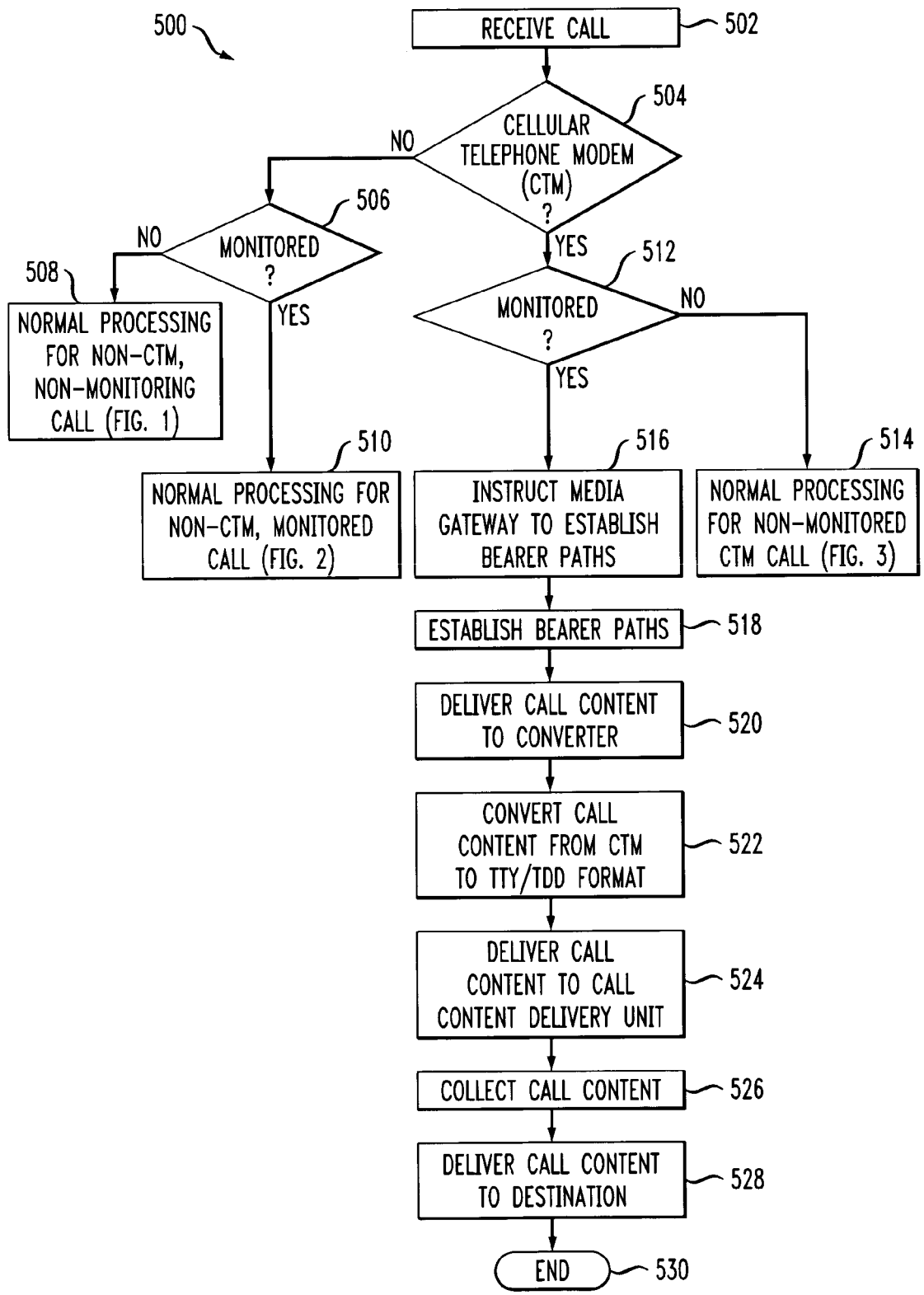
FIGS. 5(a) and 5(b) are flow charts illustrating methods according to the present invention; and, FIG. 6 is a representative sequence, or flow, diagram for the exemplary network of FIG. 4 according to the present invention.

In operation, the networks of FIGS. 4(a) through 4(d) are operable to accomplish the functionality of the present invention. In this regard, with reference to FIG. 5(a), a method 500 for processing calls in a CTM device is illustrated. This method, as well as other such methods contemplated by the invention (e.g. the methods shown in FIGS.

5(b) and 6), may be implemented using a variety of hardware modifications and software techniques.

Figure 1:
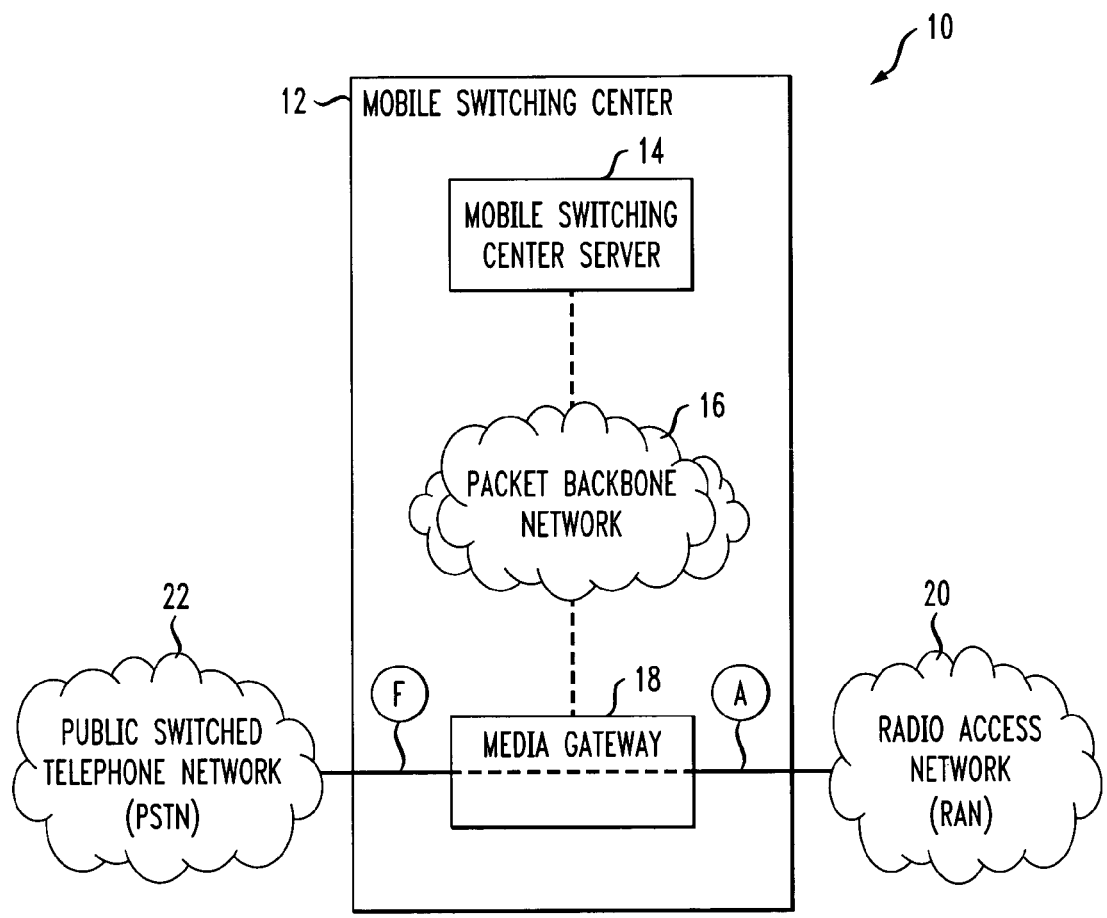
FIG. 1 illustrates a bearer path for non-CTM, non-monitored calls within an exemplary network.
Figure 2:
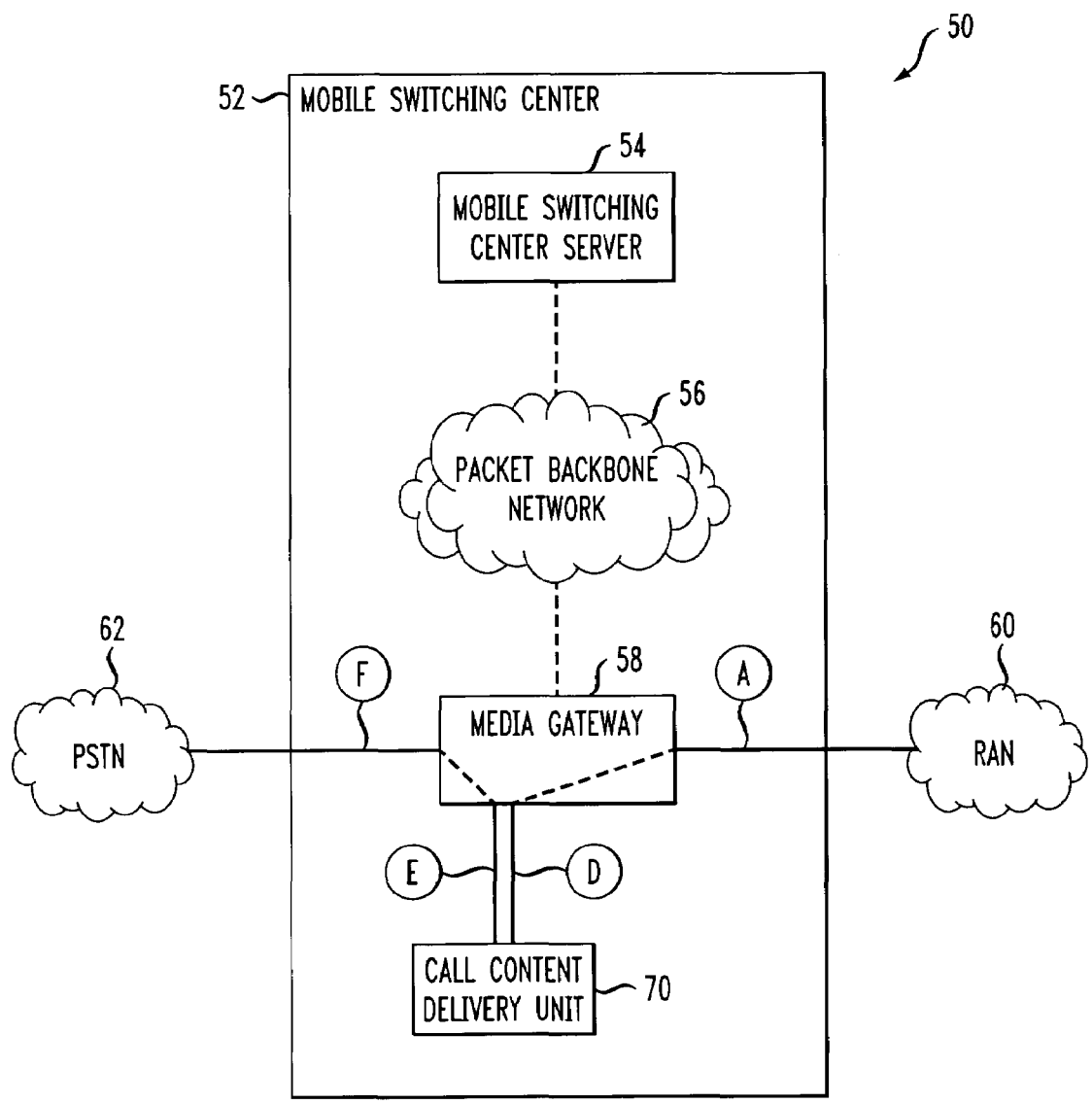
FIG. 2 illustrates a bearer path for non-CTM, monitored calls within an exemplary network.
Figure 3:
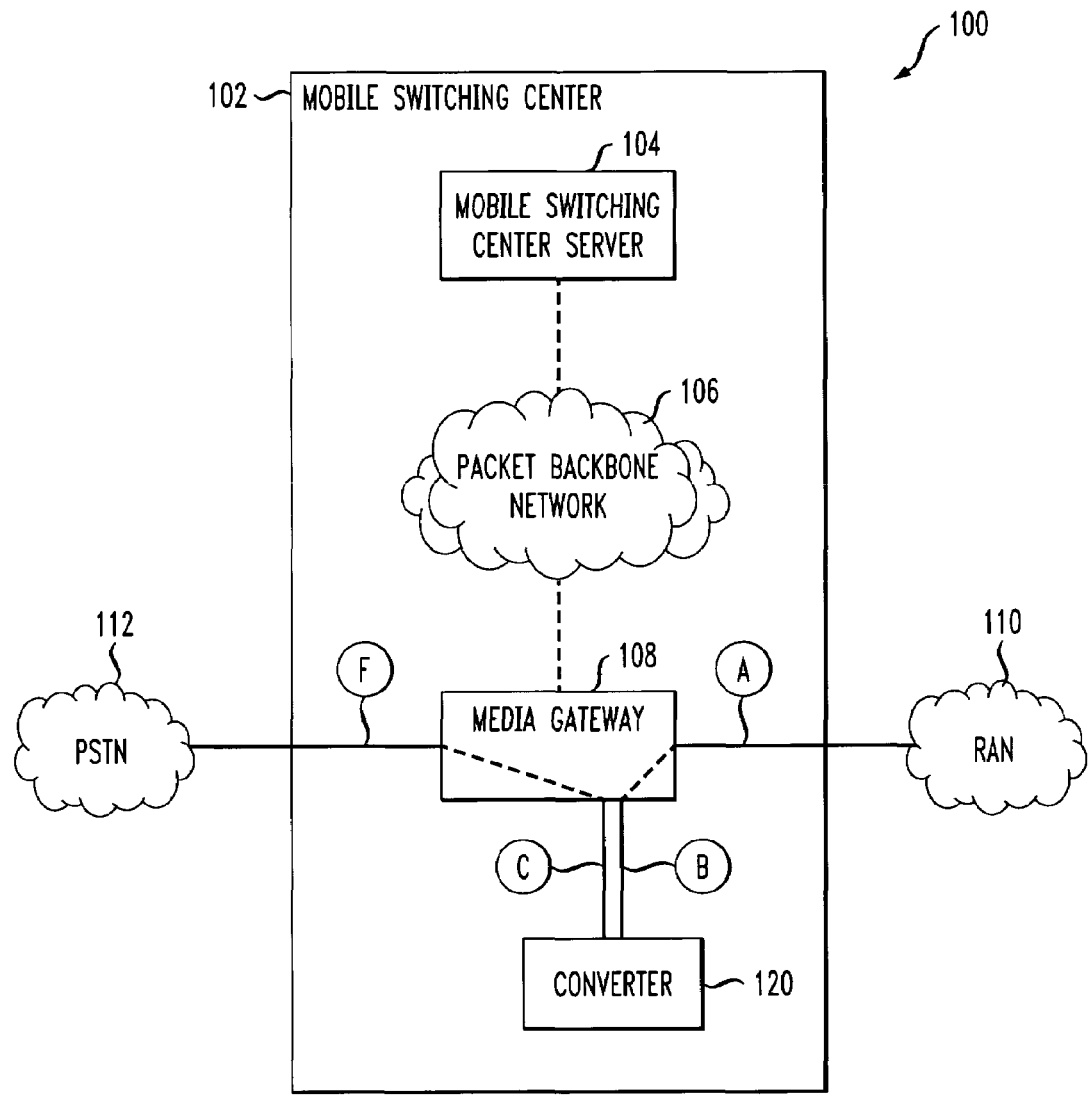
FIG. 3 illustrates a bearer path for CTM, non-monitored calls within an exemplary network.

Initially, a call is received in the media gateway (step 502). The MSC server (or, more generally, the MSC 202) may then recognize the call as having a call content in CTM format (step 504). If not, a determination is then made as to whether the call should be monitored (step 506). As noted above, this is accomplished by having the MSC server access an appropriate subscriber database within the network such as a home location register (HLR) to determine if the call should be monitored. If the call should not be monitored, normal processing for non-CTM, non-monitored calls should be conducted (step 508). In this regard, the system and description of FIG. 1 are representative of this processing. If the non-CTM call should be monitored, normal processing for non-CTM, monitored calls will be followed (step 510). This, of course, is represented by the system and description of FIG. 2. If the original call received has call content in CTM format, a determination is made as to whether the call should be monitored (step 512). If not, normal processing for non-monitored CTM calls is conducted (step 514). The system and description of FIG. 3 relate to such processing.

If, however, the MSC recognizes the call as being a monitored call at step 512, the media gateway is instructed by the MSC to establish a first bearer path to the converter 230, a second bearer path from the converter to the CCDU, and a third bearer path from the CCDU to a destination network (step 516). These bearer paths are established by the media gateway (step 518). The call content in CTM format is subsequently delivered to the converter on the first bearer path (step 520) where the call content in CTM format is converted to call content in TTY/TDD format (step 522). This conversion process is well known in the art. The call content in TTY/TDD format is then delivered to the CCDU by way of the second bearer path (step 524) and collected in the CCDU (step 526). It is to be understood that the collection of the call content in the CCDU is useful for the call monitoring process that is conducted by law enforcement agencies. The CCDU can be accessed by law enforcement authorities in manners that are well known in the art to monitor such call content.

Last, the call content is delivered in TTY/TDD format from the CCDU to its destination via the third bearer path (step 528). The process is then ended (step 530.)

Figure 5B:
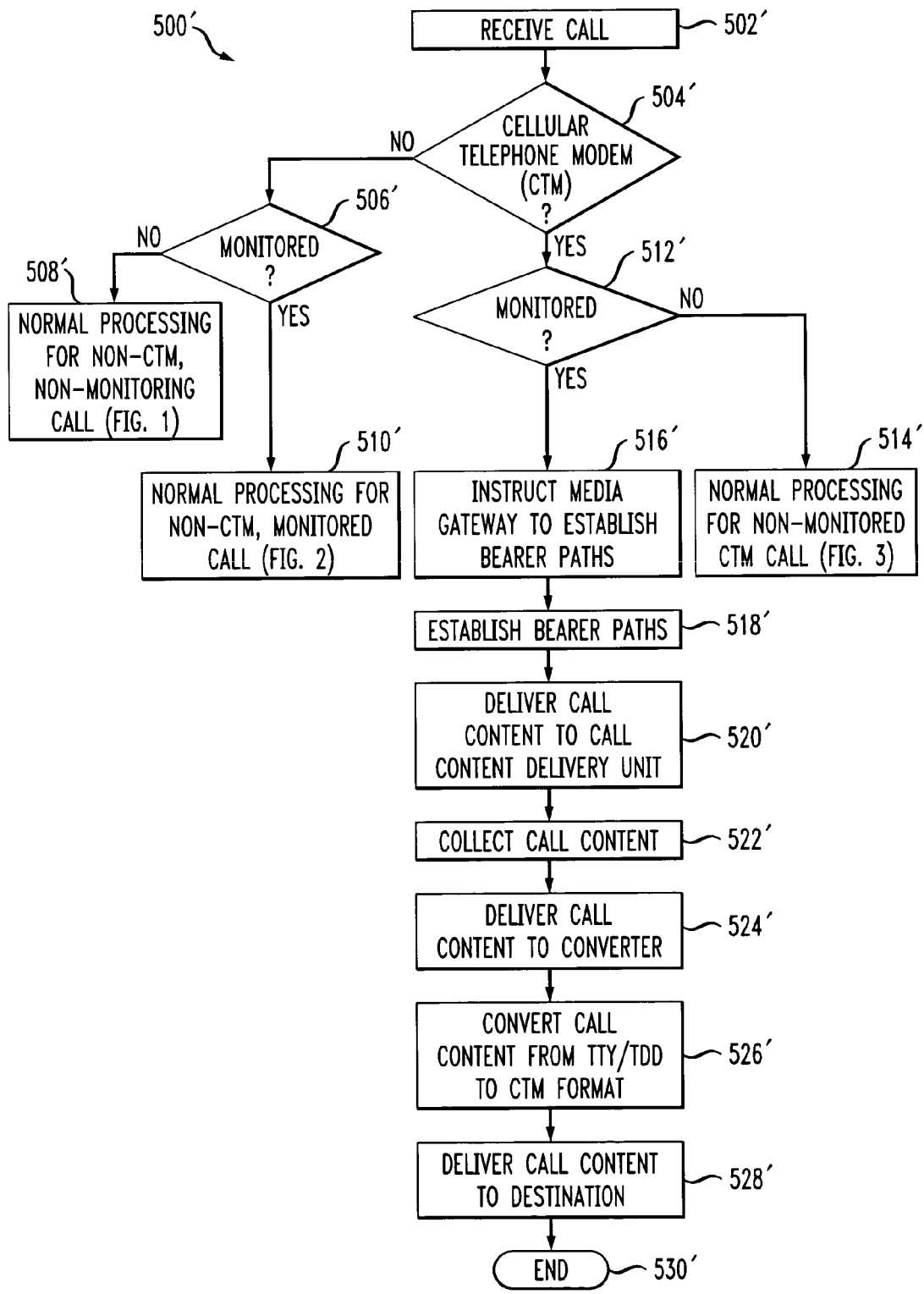

With reference to FIG. 5(b), a method 500' for processing calls terminating in a CTM device is illustrated. Initially, a call is received in the media gateway (step 502'). The MSC server (or, more generally, the MSC 202) then determines if the call terminates in a CTM device (step 504'). If not, a determination is made as to whether the call should be monitored (step 506'). If the call is a non-CTM call and is a non-monitored call, normal processing for such calls is conducted (step 508'). Again, determining whether the call should be monitored by the MSC involves the accessing of an appropriate subscriber database such as a home location register (HLR). If the non-CTM call is a monitored call, normal processing for non-CTM monitored calls is conducted (step 510'). This is represented in the configuration and description of FIG. 2.

If the original call received terminates in a CTM device, a determination is made as to whether the call should be monitored (step 512'). If not, normal processing for non-monitored CTM calls is conducted (step 514'). As above, this processing is represented by the configuration shown at FIG. 3. If the CTM call is determined to also be a monitored call, then the MSC instructs the media gateway to establish bearer paths (step 516'). Specifically, the media gateway is instructed by the MSC to establish a first bearer path to the CCDU 220, a second bearer path from the CCDU to the converter, and a third bearer path from the converter to the CTM device. The media gateway establishes these bearer paths (step 518').

Subsequently, the call content is delivered to the CCDU from the originating device (step 520'). The CCDU collects the call content (step 522'). The call content is delivered to the converter (step 524'). Of course, the converter converts the call content from TTY/TDD format to CTM format (step 526'). The call is then delivered to its destination, e.g. the CTM device (step 528'). The process is then ended (step 530').

To further illustrate the present invention, reference is made to FIG. 6. FIG. 6 illustrates a sequence, or flow, diagram in connection with the networks of FIGS. 4(a) through 4(d) wherein a call originates from a CTM device. It should be understood that a similar call flow for a call terminating in a CTM device would differ only in a sequence of operations.

As shown, a wireless phone within radio access network (RAN) 210 sends a call origination message to the MSC server 204 (or, more generally, the MSC 202), as shown at 602. The MSC server then sends a call acceptance message back to the wireless phone, as shown at 604. Upon recognition that the incoming call is a CTM call that should be monitored, the MSC server instructs the media gateway 208 to set-up a bearer path, as shown at 606. It should be appreciated that the bearer path including portions A and B connects the radio access network (RAN) 210 to the converter 230. The media gateway 208 then sends a call acceptance message back to the server 204, as shown at 608. The server 204 then instructs the media gateway 208 to establish bearer path portions C and D, as shown at 610. It should be understood that the portions C and D of the bearer path establish connection between the converter 230 and the CCDU 220. The media gateway 208 then sends a call acceptance message to the MSC server 204, as shown at 612. The MSC server 204 then sends a call connection message to the media gateway 208 to establish bearer path portions E and F, as shown at 614. It should be understood that bearer path portions E and F establish a connection between the CCDU and the destination network (e.g. PSTN network 212). The media gateway then sends a call acceptance message back to the MSC server 204, as shown at 616.

Next, the MSC server 204 sends a call origination message to the converter 230, as shown at 618. The converter 230 responds by sending a call acceptance message, as shown at 620.

After the data is converted, the MSC server sends a call origination message to the CCDU 220, as shown at 622. The CCDU 220 responds with a call acceptance message, as shown at 624. Once the call content is collected by the CCDU 220, the MSC server 204 sends a call origination message to the destination network, or PSTN 212, as shown at 626. The PSTN network sends a response, as shown at 628.

It should be appreciated that the format of the call content from the wireless device within the radio access network (RAN) 210 up to the converter 230 is in CTM format, as shown at 630. However, between the converter and the CCDU, the format of the call content is in TTY/TDD format, as shown at 632. Likewise, the call content on the voice path between the CCDU 220 and the destination network (e.g. PSTN 212) is in TTY/TDD format, as shown at 634.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for monitoring a call, originating from a cellular telephone modem (CTM) device and terminating in a destination network, in a system including a converter operative to convert call content from a CTM format to a Teletype for Telephone Devices for the Deaf (TTY/TDD) format and a Call Content Delivery Unit (CCDU), the method comprising:
   receiving the call in a media gateway of a mobile switching center (MSC);
   recognizing the call as having call content in CTM format by the MSC;
   recognizing the call as being a monitored call by the MSC;
   instructing the media gateway by the MSC to establish a first bearer path to the converter;
   establishing the first bearer path;
   instructing the media gateway by the MSC to establish a second bearer path from the converter to the CCDU;
   establishing the second bearer path;
   instructing the media gateway by the MSC to establish a third bearer path from the CCDU to the destination network;
   establishing the third bearer path;
   delivering the call content in CTM format to the converter on the first bearer path;
   converting the call content in CTM format to call content in TTY/TDD format by the converter;
   delivering the call content in TTY/TDD format to the CCDU via the second bearer path;
   collecting the call content in TTY/TDD format by the CCDU; and,
   delivering the call content in TTY/TDD format to the destination network via the third bearer path.

2. The method as set forth in claim 1 wherein the recognizing of the call as being in CTM format is accomplished during a call set-up process.

3. The method as set forth in claim 1 wherein the recognizing of the call as a monitored call comprises accessing a Home Location Register (HLR).

4. The method as set forth in claim 1 wherein the establishing of the first bearer path comprises establishing a path between the media gateway and the converter.

5. The method as set forth in claim 1 wherein the establishing of the second bearer path comprises establishing paths between the converter and the media gateway and between the media gateway and the CCDU.

6. The method as set forth in claim 1 wherein the establishing of the third bearer path comprises establishing a path between the CCDU and the media gateway.

7. A method for monitoring a call, terminating in a cellular telephone modem (CTM) device and originating from another network, in a system including a converter operative to convert call content from a CTM format to a Teletype for Telephone Devices for the Deaf (TTY/TDD) format and a Call Content Delivery Unit (CCDU), the method comprising:
   receiving the call in a media gateway of a mobile switching center (MSC);
   recognizing the call as terminating in the CTM device for processing call content in CTM format by the MSC;
   recognizing the call as being a monitored call by the MSC;
   instructing the media gateway by the MSC to establish a first bearer path to the CCDU;
   establishing the first bearer path;
   instructing the media gateway by the MSC to establish a second bearer path from the CCDU to the converter;
   establishing the second bearer path;
   instructing the media gateway by the MSC to establish a third bearer path from the converter to the CTM device;
   establishing the third bearer path;
   delivering the call content in TTY/TDD format to the CCDU on the first bearer path;
   collecting the call content in TTY/TDD format to by the CCDU;
   delivering the call content in TTY/TDD format to the converter via the second bearer path;
   converting the call content from TTY/TDD format to CTM format by the converter; and,
   delivering the call content in CTM format to the CTM device via the third bearer path.

8. The method as set forth in claim 7 wherein the recognizing of the call as terminating in CTM format is accomplished during a call set-up process.

9. The method as set forth in claim 7 wherein the recognizing of the call as a monitored call comprises accessing a Home Location Register (HLR).

10. The method as set forth in claim 7 wherein the establishing of the first bearer path comprises establishing a path between the media gateway and the CCDU.

11. The method as set forth in claim 7 wherein the establishing of the second bearer path comprises establishing paths between the CCDU and the media gateway and between the media gateway and the converter.

12. The method as set forth in claim 7 wherein the establishing of the third bearer path comprises establishing a path between the converting and the media gateway.

13. An apparatus for monitoring a call originating from a cellular telephone modem (CTM) device and terminating in a destination network, the apparatus comprising:
   means for receiving the call;
   means for recognizing the call as having call content in CTM format;
   means for recognizing the call as being a monitored call;
   means for instructing a media gateway to establish a first bearer path to the converter;
   means for establishing the first bearer path;
   means for instructing the media gateway to establish a second bearer path;
   means for establishing the second bearer path;
   means for instructing the media gateway to establish a third bearer path;
   means for establishing the third bearer path;
   means for transmitting the call content in CTM format on the first bearer path;
   means for converting the call content in CTM format to call content in TTY/TDD format;
   means for transmitting the call content in TTY/TDD format on the second bearer path;
   means for collecting the call content in TTY/TDD format; and,
   means for delivering the call content in TTY/TDD format to the destination network via the third bearer path.

14. The apparatus as set forth in claim 13 wherein the means for recognizing the call as a monitored call includes means for accessing a Home Location Register (HLR).

15. The apparatus as set forth in claim 13 wherein the first bearer path comprises a path between the media gateway and the converting means.

16. The apparatus as set forth in claim 13 wherein the second bearer path comprises paths between the converting means and the media gateway and between the media gateway and the collecting means.

17. The apparatus as set forth in claim 13 wherein the third bearer path comprises a path between the collecting means and the media gateway.

18. An apparatus for monitoring a call terminating in a cellular telephone modem (CTM) device and originating from another network, the apparatus comprising:

means for receiving the call;
means for recognizing the call as terminating in the CTM device for processing call content in CTM format;
means for recognizing the call as being a monitored call;
means for instructing a media gateway to establish a first bearer path to the CCDU;
means for establishing the first bearer path;
means for instructing the media gateway to establish a second bearer path;
means for establishing the second bearer path;
means for instructing the media gateway to establish a third bearer path;
means for establishing the third bearer path;
means for transmitting the call content in TTY/TDD format on the first bearer path;
means for collecting the call content in TTY/TDD format;
means for transmitting the call content in TTY/TDD format on the second bearer path;
means for converting the call content in TTY/TDD format to CTM format; and,
means for delivering the call content in CTM format to the CTM device via the third bearer path.

19. The apparatus as set forth in claim 18 wherein the means for recognizing the call as a monitored call includes means for accessing a Home Location Register (HLR).

20. The apparatus as set forth in claim 18 wherein the first bearer path comprises a path between the media gateway and the collecting means.

21. The apparatus as set forth in claim 18 wherein the second bearer path comprises paths between the collecting means and the media gateway and between the media gateway and the converting means.

22. The apparatus as set forth in claim 18 wherein the third bearer path comprises a path between the converting means and the media gateway.

23. A mobile switching center (MSC) operative to allow monitoring of a call between a cellular telephone modem (CTM) device and another network, the mobile switching center comprising:

a media gateway operative to receive the call;
an MSC server operative to recognize the call as having call content in CTM format or as terminating in the CTM device, to recognize the call as being a monitored call, and to instruct the media gateway to selectively establish bearer paths upon recognition that the call content is in CTM format or terminates in the CTM device and that the call is a monitored call;
a converter operative to convert the call content in CTM format to call content in TTY/TDD format and to convert al content in TTY/TDD format to CTM format; and,
a call content delivery unit (CCDU) operative to collect the call content in TTY/TDD format.

24. The mobile switching center (MSC) as set forth in claim 23 wherein a bearer path is established by the media gateway between the media gateway and the converter upon the recognition by the MSC server.

25. The mobile switching center (MSC) as set forth in claim 24 wherein the media gateway is operative to send and receive the call content in CTM format to and from the converter along the bearer path.

26. The mobile switching center (MSC) as set forth in claim 23 wherein a bearer path is established by the media gateway between the converter and the CCDU upon the recognition by the MSC server.

27. The mobile switching center (MSC) as set forth in claim 26 wherein the converter is operative to send and receive the call content in TTY/TDD format to and from the CCDU along the bearer path.

28. The mobile switching center (MSC) as set forth in claim 23 wherein a bearer path is established by the media gateway between the CCDU and the media gateway upon the recognition by the MSC server.

29. The mobile switching center (MSC) as set forth in claim 28 wherein the CCDU operative to send and receive the call content in TTY/TDD format to and from the media gateway along the bearer path.

30. The mobile switching center (MSC) as set forth in claim 23 wherein the MSC server includes means for accessing a Home Location Register (HLR) to determine if the call is a monitored call.

31. The mobile switching center (MSC) as set forth in claim 23 wherein the recognizing of the call as being in CTM format or as terminating in a CTM device is accomplished during a call set-up process.

* * * * *